United States Patent [19]

Lin et al.

[11] Patent Number: 4,642,238

[45] Date of Patent: Feb. 10, 1987

[54] PROCESS FOR THE PRODUCTION OF A MINERAL FORTIFIED PROTEIN COMPOSITION

[75] Inventors: Santa H. C. Lin; Myong J. Cho, both of Crestwood, Mo.

[73] Assignee: Ralston Purina Company, St. Louis, Mo.

[21] Appl. No.: 824,990

[22] Filed: Feb. 3, 1986

[51] Int. Cl.[4] .................... A23J 3/00; A23L 1/304
[52] U.S. Cl. ..................................... 426/74; 426/656; 426/456; 426/471
[58] Field of Search ................ 426/74, 656, 456, 471

[56] References Cited

U.S. PATENT DOCUMENTS

| | | | |
|---|---|---|---|
| 2,605,229 | 7/1952 | Marcus | 252/317 |
| 2,967,802 | 1/1961 | Towey et al. | 167/78 |
| 3,027,229 | 3/1962 | Towey et al. | 23/109 |
| 3,066,073 | 11/1962 | Ratcliff et al. | 167/55 |
| 3,375,168 | 3/1968 | Curtin et al. | 167/93 |
| 3,428,624 | 2/1969 | Toy | 260/234 |
| 3,852,497 | 12/1974 | Skelcey et al. | 426/74 |
| 3,897,575 | 7/1975 | White | 426/74 X |
| 3,901,976 | 8/1975 | Roth et al. | 426/74 X |
| 3,931,416 | 1/1976 | Grams et al. | 426/74 X |
| 4,214,996 | 7/1980 | Buddemeyer et al. | 252/1 |
| 4,216,236 | 8/1980 | Müller et al. | 426/74 X |
| 4,351,735 | 9/1982 | Buddemeyer et al. | 252/1 |

*Primary Examiner*—Robert Yoncoskie
*Attorney, Agent, or Firm*—Virgil B. Hill

[57] ABSTRACT

A method of producing a mineral enriched protein composition for use in the production of liquid foodstuffs comprising: Forming a hydrated gel of an alkaline earth salt, such as a calcium salt and adding the hydrated gel to a slurry of a soy protein isolate to form a mineral enriched soy protein composition. The composition can then be dried and upon resuspension in a liquid foodstuff results in improved suspension of the mineral in the foodstuff.

24 Claims, No Drawings

PROCESS FOR THE PRODUCTION OF A MINERAL FORTIFIED PROTEIN COMPOSITION

BACKGROUND OF THE INVENTION

The present invention relates to a method for producing a mineral enriched protein composition which is used in the production of foodstuffs, particularly liquid foodstuffs such as dietary and nutritional beverages.

Protein isolates that are derived from vegetable protein sources, such as soybeans have contributed substantially to the economic importance of these materials as a crop. Soy protein isolates in particular have proven to be a useful nutritional supplement in a variety of foods and beverages. A protein isolate can be generally characterized as a product resulting from the extraction, subsequent concentration, and purification of proteinaceous material from a proteinaceous source such as a vegetable protein material. Typically, the protein isolate on a moisture free basis will have a protein content which will range between about 90% and 98% by weight.

The usefulness of soy protein isolates in the formation of foodstuffs such as beverages has for the most part been accomplished by the production of modified or enzymatically hydrolyzed isolates or the addition of materials such as surfactants to promote the dispersibility or suspendibility of the isolate in the particular type of aqueous medium that is used in preparation of the beverage.

An example of this type of protein product, is described in U.S. Pat. No. 4,378,378 in which a simulated milk product of improved suspension characteristics is produced wherein a slurry of a vegetable protein material and dairy whey is formed, followed by the reaction of the slurry with a proteolytic enzyme. While protein isolates are generally dispersible in aqueous mediums, nevertheless it has been more difficult to employ these isolates in conjunction with certain vitamins and minerals that may be required, if a nutritionally complete beverage or drink, such as an infant formula is produced. For example, fortification of a liquid product with calcium represents a particular problem, since most forms of calcium that are employed for calcium supplementation in nutritional beverages are relatively insoluble in aqueous mediums. These materials readily precipitate or settle from aqueous suspension, thereby providing the user with a drink that must be shaken relatively often to ensure adequate consumption of the minerals in the diet.

Dispersibility of a mineral enriched protein composition has been described in U.S. Pat. No. 4,214,996, in which the mineral is chelated with an organic acid and a sugar for purposes of improving the dispersibility of the minerals in an aqueous medium such as a beverage. It is indicated that the product can be dried and reconstituted with good results.

An alternative approach to the dispersibility of specific mineral fortifying substances, such as calcium phosphate, is set forth in U.S. Pat. No. 2,605,229. This describes the production of a calcium phosphate gel which will remain dispersed in water when mixed therewith to yield a milky suspension simulating the dispersion of calcium phosphate in milk.

It would be desirable if a minerally enriched protein composition could be developed of improved suspension characteristics in which no significant precipitation of the minerals or protein medium would occur particularly upon prolonged storage of the beverage or liquid foodstuff to which the composition is added.

It is therefore an object of the present invention to develop a method for the production of a mineral enriched protein composition that can be used in the production of liquid foodstuffs in which the mineral enriching components contained in the protein material substantially remains in suspension even during periods of prolonged storage.

It is a further object of the present invention to produce a mineral enriched or calcium fortified protein composition having improved suspension characteristics in liquid foodstuffs.

SUMMARY OF THE INVENTION

The present invention is directed to a method of producing a mineral enriched protein composition, which is used in the production of liquid foodstuffs, such as nutritional beverages, and the like which usually involve supplementation of the foodstuff with minerals and protein. The mineral enriched protein composition is produced by a process comprising; forming a hydrated gel of an alkaline earth metal salt, such as a calcium salt, that is typically used for mineral enrichment or fortification of foodstuffs. This is followed by the addition of the hydrated gel of the alkaline earth metal salt to an aqueous slurry of an isolated vegetable protein material, such as a soy isolate, to form a mineral enriched protein composition. The composition is then dewatered to provide a dried, mineral fortified protein composition that can be used in the formation of liquid foodstuffs, such as nutritional beverages, requiring high levels of calcium or minerals for nutritional purposes.

DESCRIPTION OF THE PREFERRED EMBODIMENTS

The instant invention comprises a process for the production of a mineral enriched protein composition, which has improved suspension characteristics in liquid foodstuffs and overcomes problems associated with the suspension of mineral fortifying materials in dietary beverages or nutritionally balanced, liquid drink products.

In a brief outline of the total process of the present invention, and for a complete understanding thereof, the vegetable protein material which forms a component of the composition is produced pursuant to the following procedure. Soy protein isolate is typically produced from a starting material, such as defatted soybean material, in which the oil is extracted to leave soybean meal or flakes. More specifically, the soybeans may be initially crushed or ground and then passed through a conventional oil expeller. It is preferable, however, to remove the oil contained in the soybeans by solvent extraction with aliphatic hydrocarbons, such as hexane or azeotropes thereof, and these represent conventional techniques employed for the removal of oil. The defatted, vegetable protein material or soybean flakes are then placed in an aqueous bath to provide a mixture having a pH of at least about 6.5 and preferably between about 7.0 and 10 in order to extract the protein. Typically, if it is desired to elevate the pH above 6.5 various alkaline reagents such as sodium hydroxide, potassium hydroxide and calcium hydroxide or other commonly accepted food grade alkaline reagents may be employed to elevate the pH. A pH of above about 7 is generally preferred, since an alkaline extraction facilitates solubilization of the protein. Typically, the pH of the aqueous extract of protein, will be at least about 6.5 and preferably about 7.0 to 10. The ratio by weight of the aqueous extractant to the vegetable protein material is usually between about 20 to 1 and preferably a ratio of about 10 to 1.

It is also desirable in obtaining the soy protein or vegetable protein isolate used in the present invention, that an elevated temperature be employed during the aqueous extraction step to facilitate solubilization of the protein, although ambient temperatures are equally satisfactory if desired. The extraction temperatures which may be employed, can range from ambient up to about 120° F. with a preferred temperature of 90° F. The period of extraction is further nonlimiting and a period of time between about 5 to 120 minutes may be conveniently employed with a preferred time of about 30 minutes. Following extraction of the vegetable protein material, the aqueous extract of protein can be stored in a holding tank or suitable container while a second extraction is performed on the insoluble solids from the first aqueous extraction step. This improves the efficiency and yield of the extraction process by exhaustively extracting the protein from the residual solids from the first step.

The combined, aqueous protein extracts from both extraction steps, having a pH of at least 6.5, or preferably about 7.0 to 10, are then precipitated by adjustment of the pH of the extracts to, at, or near the isoelectric point of the protein to form an insoluble precipitate. The actual pH to which the protein extracts are adjusted will vary depending upon the vegetable protein material employed but insofar as soy protein, this typically is between about 4.0 and 5.0. The precipitation step may be conveniently carried out, by the addition of a common food grade acidic reagent such as acetic acid, sulfuric acid, phosphoric acid, hydrochloric acid or with any other suitable acidic reagent. Following precipitation of the protein, the solids level of the precipitated slurry is increased, such as by centrifugation or similar means for purposes of concentrating the protein and removing, insofar as possible, the whey or supernatant. The precipitated protein, in aqueous suspension, can then be employed in the production of the mineral enriched protein composition as hereinafter described.

The vegetable protein isolate is then formed into an aqueous slurry for purposes of mineral enrichment as described below. Although the protein isolate can be obtained directly from the isolation procedure as described above, in which the precipitated protein is still in the form of an aqueous suspension, it is equally possible insofar as the present invention to employ as a starting material a dried protein isolate which is dispersed into an aqueous medium to form an aqueous suspension. An essential aspect of the present invention, however, is the particular means for mineral fortification of the protein composition. It has been found, for example, that if mineral fortification of the protein isolate takes place by the addition of a hydrated gel of the mineral fortifying material as compared to the addition of a dried, mineral supplement, a product of improved suspension characteristics is achieved. The improved suspension characteristics are also retained after drying of the fortified protein composition.

A hydrated gel of an alkaline earth metal salt is prepared for purposes of providing a means for mineral enrichment of the protein material or protein isolate, wherein a mineral fortified protein composition is formed that has improved suspension characteristics when used in the production of a liquid foodstuff such as a nutritional beverage. Typical alkaline earth materials used for mineral fortification and which are considered to be essential for nutritional purposes include calcium and magnesium. Calcium has proven to be a particular problem insofar as fortification of protein supplements for liquid foodstuffs, since it is used at a higher fortification level than other minerals, in an aqueous medium such as an infant formula or nutritional beverage. For the most part, this has been accomplished in the prior art by the dispersal of a dried calcium phosphate salt in the dried protein supplement, which upon dispersion in an aqueous medium, still often results in settling of the mineral components during storage of the liquid foodstuff.

While the present invention is particularly directed towards the production of calcium fortified, protein compositions of improved suspension characteristics, it is equally adaptable to other bivalent salts such as the alkaline earth metals salts normally used for mineral fortification of foodstuffs such as magnesium. The exact means of forming the hydrated gel of the various alkaline earth metal salts is not critical to the practice of the present invention and these gels can be prepared by a variety of chemical reactions. Specifically insofar as calcium, a reaction between calcium chloride and trisodium phosphate can be used to form a hydrated gel of tricalcium phosphate according to the following reaction.

$$3CaCl_2 + 2Na_3PO_4 \rightarrow Ca_3(PO_4)_2 + 6NaCl$$

Alternatively, a reaction between calcium hydroxide and phosphoric acid can be used with an equal degree of success to form a hydrated gel of tricalcium phosphate according to the following reaction.

$$3Ca(OH)_2 + 2H_3PO_4 \rightarrow Ca_3(PO_4)_2 + 6H_2O$$

The above reactions represent typical reactions for the production of a hydrated gel of an alkaline earth metal such as calcium that has been specifically found to improve the suspension characteristics of a vegetable protein material it is fortified with.

Insofar as the production of a hydrated gel of a calcium salt, it is preferable to employ the reaction set forth above in which calcium hydroxide is reacted with phosphoric acid, because no salt is produced by this reaction. Typically, a dilute solution of calcium hydroxide is employed for a reaction with the phosphoric acid and although the exact concentration of calcium is not limiting it is preferable that the calcium level in the solution be about 0.1 to 3.0% by weight, preferably about 1.0% by weight. To this solution, is added in drop-wise fashion, concentrated phosphoric acid (85% by weight) at a uniform and slow enough rate so that the pH of the reaction mixture is maintained above about 7. It is desirable to maintain the pH of the reaction medium to above about 7 and preferably from about 9.5 to 11.5 for purposes of producing the tricalcium phosphate which is the preferred material for purposes of calcium fortification of the protein composition. If the pH of the reaction mixture is allowed to fall below about 7 then, primarily the mono and dibasic forms of calcium phosphate are formed and while these may be used with equal success in the fortification of protein materials, and are intended to be covered by the present invention, it is preferred that the tricalcium phosphate be used since, this material is the most stable form of calcium phosphate, for purposes of calcium fortification.

The reaction is allowed to proceed and a translucent hydrated gel of tricalcium phosphate begins to form. The hydrated gel, upon centrifugation provides a gel having a solids content of less than about 10% by weight preferably about 7 to 10 percent by weight. It is this hydrated translucent, gel of tricalcium phosphate which has been found to provide a protein composition of improved suspension characteristics when it is used to provide mineral fortification of the protein composition. It is important that the hydrated gel not be dried prior to addition to the protein slurry, since this has been found to not result in a mineral fortified protein composition which has the desired suspension characteristics.

The pH of the protein slurry which is produced as described above, is then adjusted to about 6.5 to 7.5 and preferably to about 6.8 to 7.0. As noted above the protein slurry will typically have a solids level of about 5 to 20 percent, by weight, preferably about 12 to 20% by weight, and most preferably about 13 to 16% by weight, although the exact solids level is not critical insofar as the addition of the hydrated mineral gel. Generally speaking, the slurry of soy protein at this level of solids is considered to be pumpable, and therefore easily transferable in a continuous process.

The hydrated, mineral gel is then added to the protein slurry in an amount effective to provide a mineral fortified protein composition, with the exact amount to be added, to be dependent upon the degree of fortification desired. For example in the case of adults, a level of about 1.5% calcium based upon the protein solids in the composition is sufficient to meet the daily requirement, whereas, in the case of infants or in the event one wants to simulate milk by providing a comparable calcium level, the level is usually about 2.7%–3.5% or higher. Therefore the exact amount of gel added, is entirely dependent upon the degree of fortification desired, and the specific amount added is not intended to limit the present invention.

While it is preferable to employ a heating step as set forth below, a heating step is not essential to the present invention and can be deleted if desired depending upon the type of protein composition desired. Typically a heating step is desirable for purposes of inactivating any undesirable enzyme-inhibitors such as trypsin inhibitors, and it is desirable to inactivate these inhibitors by the application of heat prior to the formulation of the protein composition. It is also not critical, whether or not the heating step be employed before or after addition of the hydrated gel to the protein slurry. The protein slurry, containing the hydrated gel added for purposes of fortifying the protein, is then heated at a temperature of about 220° to 400° F., and preferably at a temperature of 260° to 310° F. for a few seconds up to several minutes, and preferably about 7 to 100 seconds. Preferably, heating is carried out in a jet cooker or similar apparatus, in which jets of steam intersect segments of the slurry in such a manner, that the slurry is dynamically heated under conditions of both elevated temperature and pressure. Following heating of the slurry under the dynamic conditions of elevated temperature and pressure, the slurry with the protein and minerals is typically ejected into a container of lower pressure which causes volatilization of a portion of the water, contained in the slurry with resultant cooling of the slurry to a temperature of about 150° F. or less.

The cooled slurry can then be dewatered by any type of drying procedure, but it is preferred to spray-dry the slurry to provide the most uniform mixture of the mineral fortifying salt and the protein and provide a product which has excellent dispersibility characteristics in aqueous mediums. The dried product has excellent suspension characteristics in a liquid foodstuff, and overcomes the separation problems normally associated with using mineral fortified protein compositions in liquid foodstuffs, such as nutritional beverages.

The following examples represent specific but non-limiting embodiments of the present invention.

EXAMPLE 1

A soy protein isolate is prepared in which 150 lb/hr of defatted soybean flakes are fed to an extraction tank to which is added 1500 lb/hr of water which is heated to 90° F. Sufficient calcium hydroxide is added to adjust the pH of the mixture to 9.7. The soy flakes are extracted for a period of 30 minutes after which the aqueous solution is separated from the extracted flakes by centrifugation. The first aqueous extract is held while the extracted flake residue is redispersed in 900 lb/hr of water at a temperature of 90° F. The pH of the mixture at this point is 9.0.

A second aqueous extract from the flakes is obtained by centrifugation and combined with the first aqueous extract. To the combined extracts, 37% hydrochloric acid is added to adjust the pH to 4.5 and precipitate the protein. The precipitated protein is then centrifuged to remove excess liquid to a solids level of 24–28% by weight. The precipitated protein is then diluted with water to form a slurry having a solids level of 7.5% by weight. The pH of the slurry is adjusted to 6.6 by the addition of sodium hydroxide.

A hydrated gel of tricalcium phosphate is prepared by slowly adding a solution of calcium chloride (3.6% by weight) to a solution of trisodium phosphate (3.6% by weight) and reacted for 30 minutes. The pH of the reaction mixture was above 9.5. A translucent, hydrated precipitate of tricalcium phosphate is formed, which is concentrated by centrifugation. The concentrated gel is then washed twice with an equal weight of water, and again concentrated each time by centrifugation to a solids level of 6% by weight. The gel of tricalcium phosphate is then added to the slurry of soy isolate. The slurry, following addition of the gel has a solids level of 7% by weight and a pH of 7.0±0.05. The gel was added in an amount sufficient to provide a calcium level of 2.7% by weight of the protein solids on a dry basis and the fortified slurry was allowed to equilibrate for 1 hour. The mineral fortified slurry is then spray-dried to a moisture level of less then 5% by weight.

EXAMPLE 2

A mineral fortified slurry is prepared as described in Example 1 except that the washed residue or gel of tricalcium phosphate was dispersed in a solution of sodium hydroxide that contained sufficient sodium hydroxide to neutralize the slurry of acid precipitated soy isolate to pH 6.6 and to provide a slurry of the gel and isolate with a solids level of 7% by weight for spray drying.

EXAMPLE 3

A mineral fortified protein slurry is produced as described in Example 1 except that following addition of the gel is tricalcium phosphate to the protein slurry, the slurry is maintained at 90° C. for 10 minutes and homogenized at 2500 psi prior to spray drying.

EXAMPLE 4

A mineral fortified protein slurry is produced as described in Example 1 except that the fortified slurry had a solids level of 11% by weight prior to spray drying.

EXAMPLE 5

A mineral fortified protein slurry is prepared as described in Example 2 except that the slurry has a solids level of 11% by weight prior to spray-drying.

EXAMPLE 6

A mineral fortified slurry is prepared as described in Example 1 except that a sufficient amount of the tricalcium phosphate gel was added to provide a calcium level of 5% by weight of the protein solids on a dry basis.

EXAMPLE 7

A mineral fortified protein slurry is prepared as described in Example 1 except that the slurry has a solids level of 5% by weight prior to drying. The fortified slurry is freeze dried to a moisture level of 4% by weight.

EXAMPLE 8

A mineral fortified protein slurry is prepared as described in Example 1 except that the slurry contained a sufficient quantity of the gel to provide a calcium level of 20.0% by weight of the protein solids on a dry basis, and the fortified slurry has a solids level of 5% prior to spray-drying.

EXAMPLE 9

A control sample is prepared, in which a slurry of soy isolate is formed which is produced in accordance with Example 1, having a pH of 6.8 and a solids level of 7% by weight. To the slurry is added sufficient dried tricalcium phosphate to provide a calcium level of 2.7% by weight of the protein solids on a dry basis. The fortified slurry is then spray-dried as described in Example 1.

EXAMPLE 10

Each of the calcium fortified isolates produced according to Examples 1-9 is used to prepare an infant formula having the following formulation.

| Ingredient | g/1000 ml |
| --- | --- |
| Maltodextrin (15 D.E.) | 69 |
| Soybean Oil | 34 |
| Calcium Fortified Soy Isolate Examples (1-9) | 24-26 |
| Lecithin | 1.0 |
| Potassium Citrate | 2.2 |
| Sodium Chloride | 0.5 |
| Magnesium Chloride (MgCl$_2$6H$_2$O) | 0.53 |
| Carrageenan | 0.10 |
| Water | 867 |

The infant formula is prepared by the following procedure:

1. Disperse the carrageenan in the deionized water, followed by solubilization of the potassium citrate.
2. The mineral fortified isolate (Examples 1-8) or control fortified isolate (Example 9) is dispersed in the water solution.
3. The sodium and magnesium chloride is added and mixed.
4. Check the pH of the mixture and adjust to 7.1±0.1 if necessary.
5. Heat the mixture to 150° F.
6. Add the maltodextrin.
7. Add the soybean oil/lecithin preheated to 150° F.
8. Heat the mixture to 180° F.
9. Homogenize the mixture in a two stage homogenizer at 2,500 psi and 500 psi.
10. Bottle the mixture, and retort at 255° F. for 11.5 minutes.

Table 1 sets forth an evaluation of each infant formula prepared using the protein compositions of Examples 1-9, insofar as the suspension of the mineral in the formula which is evaluated after 10 day storage.

TABLE 1
Evaluation of Infant Formulas Prepared with Fortified Protein Compositions of Examples 1-9

| Example | pH of Formula | Mg of Calcium in 100 g of Formula | Suspended Calcium Mg/100 g | % Total |
| --- | --- | --- | --- | --- |
| 1 | 6.8 | 85 | 85 | 100 |
| 2 | 6.8 | 56 | 46 | 82 |
| 3 | 6.8 | 73 | 73 | 100 |
| 4 | 6.8 | 54 | 51 | 94 |
| 5 | 6.8 | 60 | 43 | 72 |
| 6 | 6.9 | 64 | 64 | 100 |
| 7 | 6.8 | 65 | 42 | 65 |
| 8 | 6.9 | 53 | 27 | 51 |
| 9 (control) | 6.7 | 60 | 12 | 20 |

The data in Table 1 shows the improvement in suspension characteristics when the process of the present invention is used to prepare the mineral fortified protein composition, which in turn is used in a nutritional beverage, such as an infant formula.

EXAMPLE 11

A soy protein isolate is prepared in which 150 lb/hr of defatted soybean flakes are fed to an extraction tank to which is added 1500 lb/hr of water which is heated to 90° F. Sufficient calcium hydroxide is added to adjust the pH of the mixture to 9.7. The soy flakes are extracted for a period of 30 minutes after which the aqueous solution is separated from the extracted flakes by centrifugation. The first aqueous extract is held while the extracted flake residue is redispersed in 900 lb/hr of water at a temperature of 90° F. The pH of the mixture at this point is 9.0.

A second aqueous extract from the flakes is obtained by centrifugation and combined with the first aqueous extract. To the combined extracts, 37 hydrochloric acid is added to adjust the pH to 4.5 and precipitate the protein. The precipitated protein is then centrifuged to remove excess liquid to a solids level of 24-28% by weight. The precipitated protein is then diluted with water to form a slurry having a solids level of 14.5% by weight. The pH of the slurry is adjusted to 6.8 by the addition of sodium hydroxide.

A hydrated gel of tricalcium phosphate is prepared by slowly adding a solution of phosphoric acid (85% by weight) to a solution of calcium hydroxide (2.0% by weight) and reacted for 30 minutes. A translucent, hydrated precipitate of tricalcium phosphate is formed, which is concentrated by centrifugation. The concentrated gel of tricalcium phosphate is then added to the slurry of soy isolate. The slurry, following addition of the gel has a solids level of 14% by weight and a pH of 7.0±0.05. The gel is added in an amount sufficient to provide a calcium level of 2.6% by weight of the protein solids on a dry basis and the fortified slurry was allowed to equilibrate for 1 hour.

The calcium fortified slurry is then passed through a jet cooker at a pressure of 85 psig. The steam heats the slurry in the jet cooker to a temperature of 310° F. After 8–10 seconds, progressive portions of the heated slurry are discharged into a receiver at below atmospheric pressure. The mineral fortified slurry is then spray-dried to a moisture level of less then 5% by weight.

EXAMPLE 12

A mineral fortified protein slurry is prepared as described in Example 11, except that 1.0% by weight solutions of calcium hydroxide and phosphoric acid are used to prepare the mineral gel for addition to the isolate. The gel is added in this Example in an amount sufficient to provide a calcium level of 2.7% by weight of the protein solids.

EXAMPLE 13

Each of the isolates obtained from Examples 11–12 were used to prepare infant formulas as generally described in Example 10. Table 2 set forth below, contains an evaluation of each infant formula prepared using the protein compositions of Examples 11–12, insofar as suspension of the mineral in the formula. A control sample was used for comparison, which was produced by adding dried tricalcium phosphate to a nonfortified isolate.

TABLE 2
Evaluation of Infant Formulas Prepared with Fortified Protein Compositions of Examples 11–13

| Example | pH of Formula | Mg of Calcium in 100 g of Formula | Suspended Calcium Mg/100 g | % Total |
|---|---|---|---|---|
| 11 | 6.8 | 67 | 67 | 100 |
| 12 | 6.8 | 65 | 62 | 94 |
| control | 6.8 | 75 | 15 | 20 |

It is apparent that the calcium fortified isolate prepared according to the present composition exhibited better performance in the infant formulas, insofar as suspension of the calcium in the formulas.

It is intended to include within the scope of the present invention, all reasonable equivalents, variations or modifications thereto.

We claim:

1. A method of producing a mineral enriched protein composition for use in the product of foodstuffs comprising:
   (a) forming a hydrated gel of an alkaline earth metal salt used for mineral enrichment;
   (b) adding said hydrated gel to an aqueous slurry of an isolated vegetable protein material to form a mineral enriched protein composition; and
   (c) dewatering said composition.

2. The method of claim 1 wherein the alkaline earth salt is a calcium salt.

3. The method of claim 1 wherein the salt is calcium phosphate.

4. The method of claim 1 wherein the salt is tricalcium phosphate.

5. The method of claim 1 wherein the hydrated gel is formed by reaction between an alkaline earth hydroxide and a mineral acid at a pH above about 7.

6. The method of claim 5 wherein the alkaline earth hydroxide is calcium hydroxide.

7. The method of claim 5 wherein the mineral acid is phosphoric acid.

8. The method of claim 5 wherein the pH is about 7.5 to 9.5.

9. The method of claim 1 wherein the slurry has a solids level of about 5 to 20% by weight and a pH of about 6.5 to 7.5.

10. The method of claim 1 wherein the hydrated gel has a solids level which is less than about 10% by weight.

11. The method of claim 1 wherein dewatering is carried out by spray-drying.

12. A method of producing a calcium enriched protein composition of improved suspension characteristics in liquid foodstuffs comprising:
   (a) forming a hydrated gel of a calcium salt;
   (b) adding said hydrated gel to an aqueous slurry of an isolated vegetable protein material to form a calcium enriched protein composition; and
   (c) dewatering said composition.

13. The method of claim 12 wherein the dewatered composition has a calcium level of at least about 1.5% by weight of the protein solids.

14. The method of claim 13 wherein the dewatered composition has a calcium level of at least about 2.7% by weight of the protein solids.

15. The method of claim 12 wherein the salt is calcium phosphate.

16. The method of claim 12 wherein the salt is tricalcium phosphate.

17. The method of claim 12 wherein the hydrated gel is formed by reaction between calcium hydroxide and a mineral acid at a pH above about 7.

18. The method of claim 17 wherein the mineral acid is phosphoric acid.

19. The method of claim 17 wherein the pH is about 7.5 to 9.5.

20. The method of claim 1 wherein the slurry has a solids level of about 5 to 20% by weight and a pH of about 6.5 to 7.5.

21. The method of claim 12 wherein the hydrated gel has a solids level which is less than about 10% by weight.

22. The method of claim 12 wherein dewatering is carried out by spray drying.

23. The method of claim 12 wherein the vegetable protein material is soy.

24. The method of claim 12 wherein the aqueous slurry of vegetable protein material is heated to a temperature of about 220° to 400° F. for a period of time sufficient to inactivate enzyme inhibitors in said protein.

* * * * *